Sept. 15, 1953  J. MEES, SR  2,652,009
ROLLING PIN
Filed Nov. 23, 1951

INVENTOR.
John Mees, Sr.,
BY
Attorney

Patented Sept. 15, 1953

2,652,009

UNITED STATES PATENT OFFICE 2,652,009

ROLLING PIN

John Mees, Sr., Chicago, Ill.

Application November 23, 1951, Serial No. 257,815

2 Claims. (Cl. 107—50)

My invention relates to improvements in rolling pins used by bakers for rolling out dough or similar operations involved in baking operations.

An important object of my invention is to provide a rolling pin which will have pressure applicator handle means permitting a person's hands to apply pressure uniformly and directly over the surface of the dough being rolled or thinned out.

A further object of my invention is to provide a rolling pin of the aforementioned character which is mounted on ball bearing structures so as to minimize the frictional resistance to the rolling operation.

A still further object of my invention is to provide support means which may be manipulated and pressure applied thereto for the entire length of the rolling pin, thus evening the rolling pressure and tending to produce a more even result, the product being rolled possessing even thickness throughout.

The foregoing and other objects and advantages I attain in the structure hereinafter described, defined in the appended claims, and illustrated in the accompanying drawings, which form a part of this application, in which like characters of reference indicate corresponding parts throughout the several views, and in which:

Figure 1:
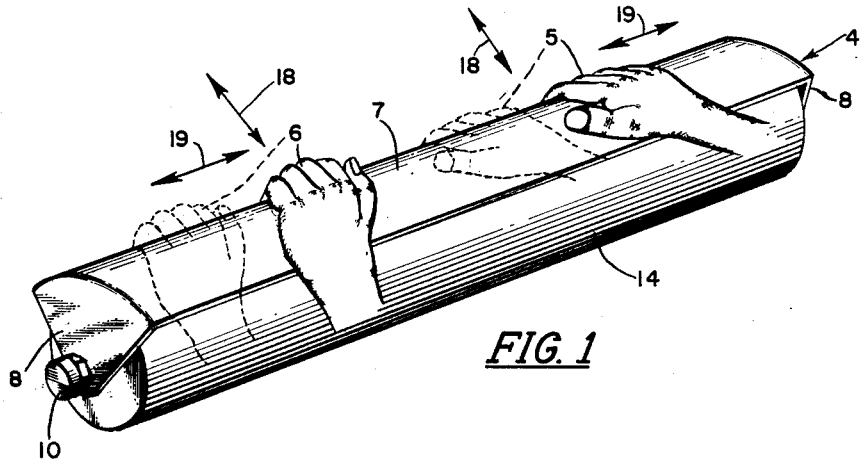
Fig. 1 is a perspective view illustrating how the human hands may be moved during the rolling operation so as to effectively even the rolling pressure throughout the affectively applied pressure directly applied by the rolling pin proper.

Referring to the various views, my invention is generally designated 4. Fig. 1 shows how the hands 5 and 6 may be positioned anywhere along the pressure applicator means 7 so as to effectively roll out dough or other like material evenly resulting in even thickness.

Figure 2:
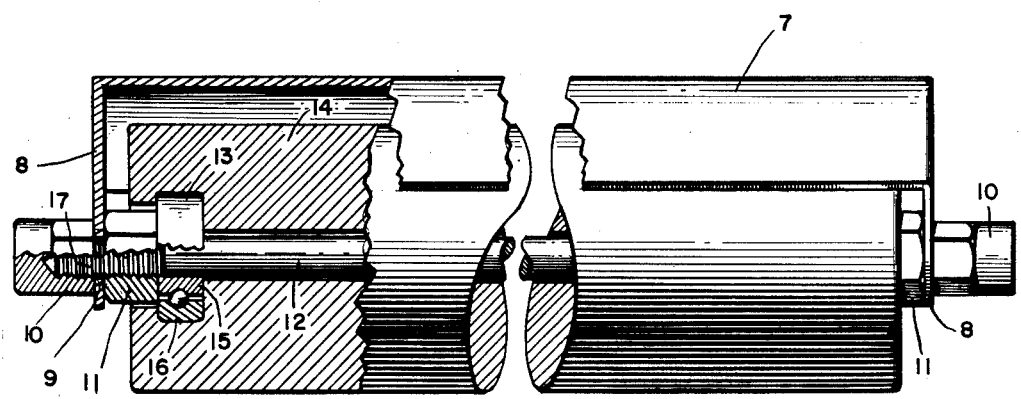
Fig. 2 is a front view of my invention in enlarged form with certain portions thereof broken away and shown in section so as to elucidate more clearly the detailed elemental arrangement thereof.
Figure 3:
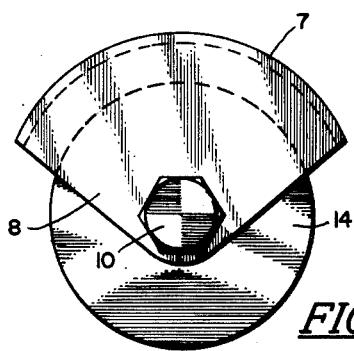
Fig. 3 is an end view of Fig. 2.

The construction is more clearly depicted in Fig. 2, where it will be noted that a central supporting shaft 12 is secured to the inner race 15 of the ball bearing 13, the outer race 16 of the said ball bearing being firmly imbedded in suitable bores in the rolling pin proper, designated 14. The terminals of the shaft 12 are threaded at each end in order to receive the nuts 11, forming a support for the depending ears 8 of the pressure applicator means 7, which have a bore 9 therein to fit over the threaded portion 17, ultimately receiving the lock nut 10, so that the entire arrangement is securely assembled to the rolling pin 14, allowing the rolling pin 14 maximum freedom for rolling action, minimizing frictional resistances, in view of the fact that the roller bearings 13 are assembled at each end.

The use of the rolling pin is simple: the material to be rolled is placed under the bottom surface of the rolling pin 14, and the hands are caused to move the rolling pin in the direction of arrows 18 as shown, the hands also being privileged to move in the direction of arrows 19 as indicated, so that a uniform rolling operation will result and the material being rolled will assume a homogeneously even thickness and texture throughout.

The pressure applicator means 7 is of arcuate formation so as to fit the palms of the hands 5 and 6 conveniently so as to relieve strain, and allow the maximum pressure from the hands to be transmitted directly by the bottom of the rolling pin imparting rolling pressure to the material being rolled during its rolling action and operation.

I believe, I have herein illustrated and described the nature of my invention, and expounded, in expository form, the teachings so that those familiar with the art will be able to practice my invention. Inasmuch as the same is susceptible of many modifications, alterations, and improvements, I hereby reserve the right to any improvements, alterations and modifications coming within the scope and spirit of my invention and disclosure, also the right to any improvements impliably embraced in the accompanying illustrations depicting the generally suggested elemental structure of my invention, and also any modification, improvements, or alterations, falling within the purview of the foregoing description, my invention to be limited only by the subjoined claims.

Having thus disclosed and revealed my invention, what I claim as new and desire to secure by Letters Patent is:

1. In rolling pin means, including a roller element provided with an axial bore therethrough, and a central supporting shaft fitted to operate freely in the said bore and provided with threaded portions extending beyond the confines of the said roller element, pressure applicator means of arcuate cross-sectional configuration and provided with depending ears at each end thereof, clearance bores at the lower portion of the said ears fitted over the said threaded portions, and lock nut means securing the said depending ears to the said shaft.

2. In rolling pin means, including a roller element provided with an axial bore therethrough, and a central supporting shaft fitted to operate freely in the said bore and provided with threaded portions extending beyond the confines of the said roller element, pressure applicator means of arcuate cross-sectional configuration and provided with depending ears at each end thereof, clearance bores at the lower portion of the said ears fitted over the said threaded portions, and lock nut means securing the said depending ears to the said shaft, the radius of the said arcuate cross-sectional configuration being of larger magnitude and concentric with respect to the radius of the said roller element.

JOHN MEES, Sr.

References Cited in the file of this patent

UNITED STATES PATENTS

| Number | Name | Date |
|---|---|---|
| 1,323,410 | Sams | Dec. 2, 1919 |
| 1,357,001 | Priborsky | Oct. 26, 1920 |
| 1,810,050 | Klempp | June 16, 1931 |